United States Patent [19]

Morris

[11] Patent Number: 4,738,397

[45] Date of Patent: Apr. 19, 1988

[54] SUPPORT ARM DEVICE

[75] Inventor: Timothy W. Morris, Bells, Tenn.

[73] Assignee: James H. Shellabarger, Jr., Jackson, Tenn.

[21] Appl. No.: 903,991

[22] Filed: Sep. 5, 1986

[51] Int. Cl.⁴ .............................................. B05B 15/08
[52] U.S. Cl. .................................... 239/164; 239/172; 239/176; 239/587; 248/75
[58] Field of Search ............... 239/172, 176, 588, 164, 239/169, 175, 159, 162, 280.5, 282, 283, 587; 47/17; 248/75, 79, 80

[56] References Cited

U.S. PATENT DOCUMENTS

| Re. 26,166 | 3/1967 | Inhofer | 47/1.7 |
| 1,416,065 | 5/1922 | Rhodes | 239/176 X |
| 2,706,133 | 4/1955 | North, Jr. et al. | 248/75 X |
| 3,016,201 | 1/1962 | Brogden | 239/176 X |
| 3,310,239 | 3/1967 | Hesp et al. | 239/172 X |
| 3,797,743 | 3/1974 | Kommers et al. | 239/172 X |

Primary Examiner—Andres Kashnikow
Attorney, Agent, or Firm—Watson, Cole, Grindle & Watson

[57] ABSTRACT

A support arm device for use in supporting a spray head in spraying liquids. The device comprises an elongated support portion having a longitudinal axis, and an elongated mounting portion attached at a point between its ends to one end of the support portion. The mounting portion has a longitudinal axis transverse to the axis of the support portion and at least one end of the mounting portion includes fastner. The device further includes an elongated leg portion attached to the other end of the support portion and having a longitudinal axis transverse to the axis of the support portion. A releasable clamp is about the leg portion, the clamp for securing a spray head into the device.

7 Claims, 2 Drawing Sheets

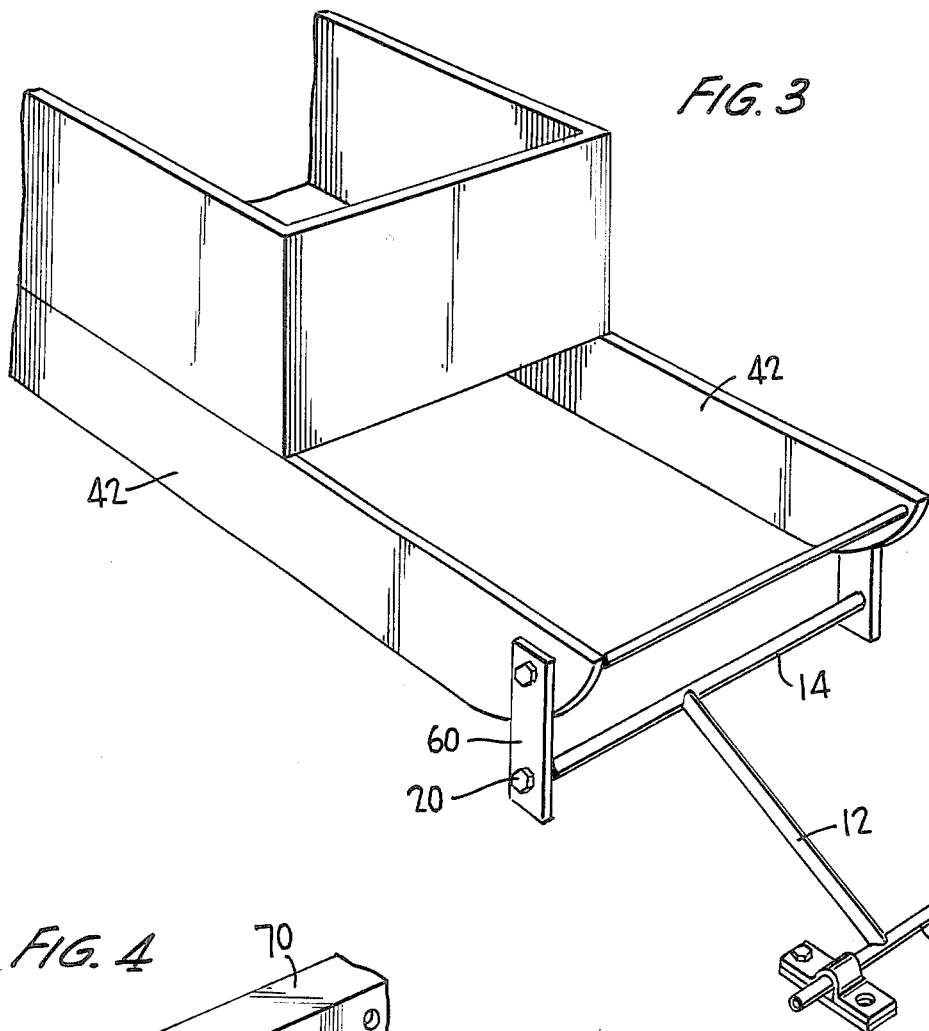
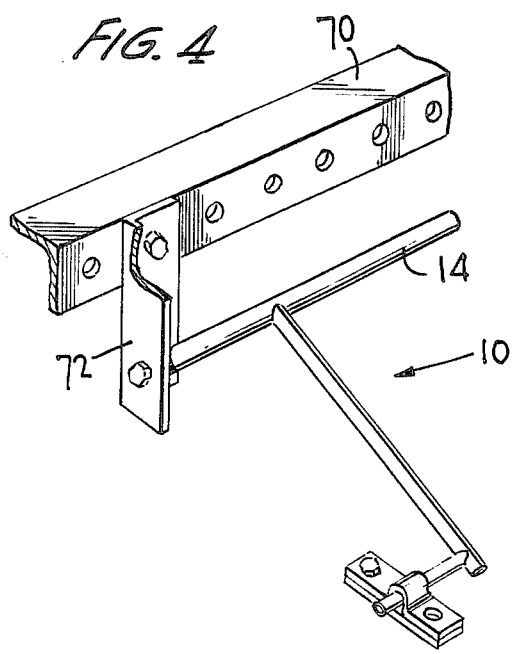
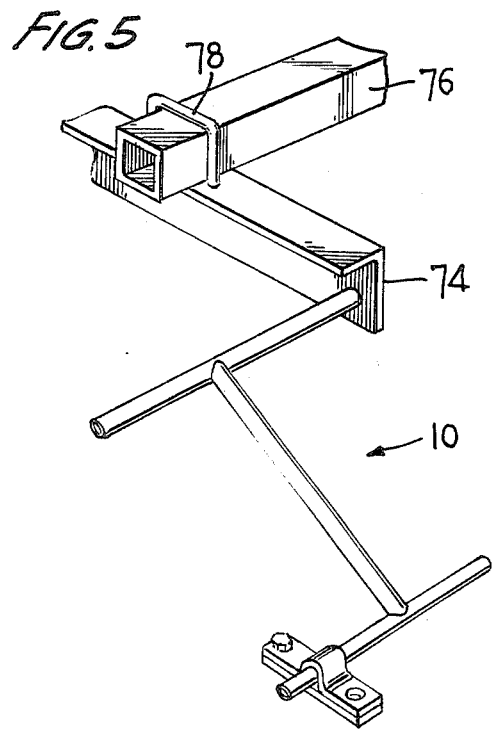

SUPPORT ARM DEVICE

The present invention relates generally to devices for the application of agricultural chemicals and, more particularly, to a support arm device adapted for use in supporting a spray head for spraying agricultural chemicals.

BACKGROUND OF THE INVENTION

In modern day farming operations, particularly in grain farming operations, it is necessary to apply a number of agricultural chemicals to the crops at various times during the growing season. Such agricultural chemicals include fertilizers, pesticides, herbicides and the like. Since these chemicals are normally in liquid form or applied using a carrier liquid, spraying is the most convenient and commonplace mode of application.

Various apparatus are known in the agricultural arts for the spray type application of liquid type chemicals. One type of such apparatus is used solely for spraying and comprises a wheeled vehicle supporting a tank containing the agricultural chemical and one or more spray heads communicating with the interior of the tank. The vehicle is adapted to be towed behind a tractor or the like when spraying operations are conducted. Examples of apparatus of this type are shown in U.S. Pat. No. 1,471,256 to Frederick; U.S. Pat. No. 1,561,645 to Howard and U.S. Pat. No. 3,515,349 to Mecklin et al.

Another type of apparatus for applying agricultural chemicals comprises attachments for conventional farming equipment which enables spraying to be accomplished while other farm operations are being conducted. For example, devices are known which attach to a conventional planter, disc or the like to enable the application of chemicals during planting or discing operations. Devices of this type are shown and described in U.S. Pat. No. 3,632,043 to Kirschmann and in U.S. Pat. No. 3,874,593 to Wilt.

Since agricultural spray apparatus of both types are normally used to apply a variety of chemicals to different crops, it is important that the apparatus be capable of adjustment so as to vary the spray applications height, spray angle, row spacing and the like to provide the optimum spraying conditions for that particular chemical and the particular crop at its stage of growth. While most conventional apparatus have some degree of adjustability for spraying conditions, the adjustment is often times difficult and optimum spray position cannot always be achieved due to inherent limits in the adjustablity.

SUMMARY OF THE INVENTION

It is therefore a feature of the present invention to provide a support arm for a spray head which is adjustable in at least three directions.

It is another feature of the present invention to provide a support arm device for a spray head in a spraying apparatus which is easily and quickly adjusted.

Briefly, the present invention in its broader aspects comprehends a support arm device for use in supporting a spray head in spraying liquids, the device comprising an elongated support position having a longitudinal axis; an elongated mounting portion having a longitudinal axis essentially perpendicular to the axis of the support portion, at least one end of the mounting portion including fastening means; and elongated leg portion attached to the other end of the support portion and having a longitudinal axis transverse to the axis of the support portion; and a releasable clamp about the leg portion, the clamp including means for securing a spray head.

Further objects, advantages and features of the present invention will become more fully apparent from a detailed consideration of the arrangement and construction of the constitutent parts as set forth in the following description taken together with the accompanying drawing.

BRIEF DESCRIPTION OF THE DRAWING

FIG. 3 is a perspective view of another embodiment of a support arm device according to the invention, the device being illustrated attached to the frame of an agricultural planter, FIG. 4 illustrates another manner in which the support arm device of FIG. 3 can be mounted on an agricultural implement, and FIG. 5 illustrates yet another manner in which the support arm device of FIG. 3 can be mounted on an agricultural implement.

DETAILED DESCRIPTION OF THE PREFERRED EMBODIMENT

Figure 1:
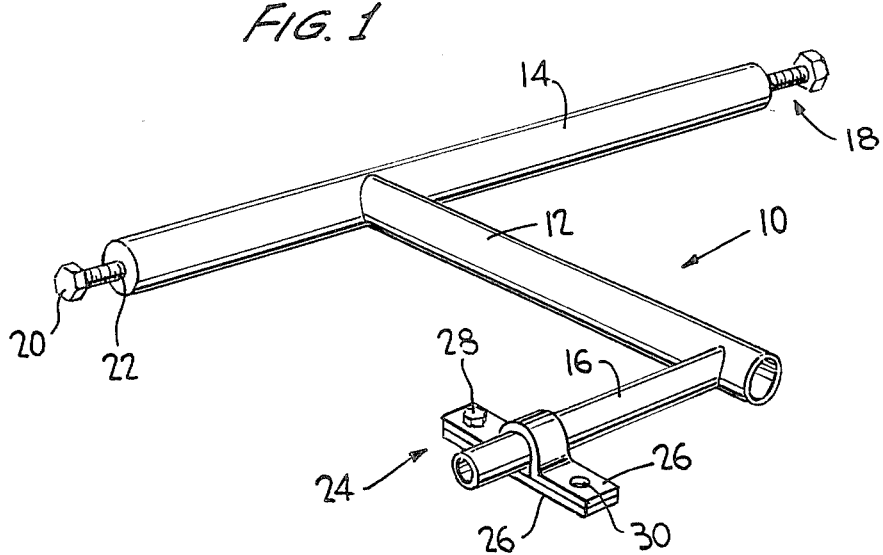
FIG. 1 is a perspective view of one embodiment of a support arm device according to the present invention.

In FIG. 1, shown is one embodiment of a support arm device 10 according to the present invention which is particularly adapted for supporting a spray head for spraying liquids. Device 10 comprises elongated support portion 12 having a longitudinal axis. Attached to one end of support portion 12 is mounting portion 14 and at the other end is attached leg portion 16. Both mounting portion 14 and leg portion 16 are elongated and have a longitudinal axis transverse, preferably perpendicular, to the longitudinal axis of the support portion 12. Portions 12, 14 and 16 can be fabricated from any material of sufficient strength but preferably are of steel pipe or bar stock which are then welded into a suitable configuration for device 10.

Each end of mounting portion 14 is provided with releasable fastening means 18, in this embodiment comprising bolts 20 and corresponding threaded axial hole 22 in the ends of the mounting portion. Fastening means 18 is for releasably securing device 10 to a suitable support such as an agriculture implement and for maintaining the device in various orientations relative to the support.

Releasably secured to leg portion 16 is clamp 24 comprising two thin straps 26 secured together at one end and releasably secured by a clamp bolt 28 at the other end. The intermediate portions of straps 26 extend around opposite sides of leg portion 16 such that clamp 24 can be firmly secured to the leg portion. Clamp 24 further includes means for securing a spray head (not shown) which, in this embodiment, comprises aligned hole 30 in straps 26 through which a spray head nozzle can be inserted and secured thereto by nuts. Such an arrangement for the spray head would secure the ends of straps 26 opposite from bolt 28 to each other.

Figure 2:
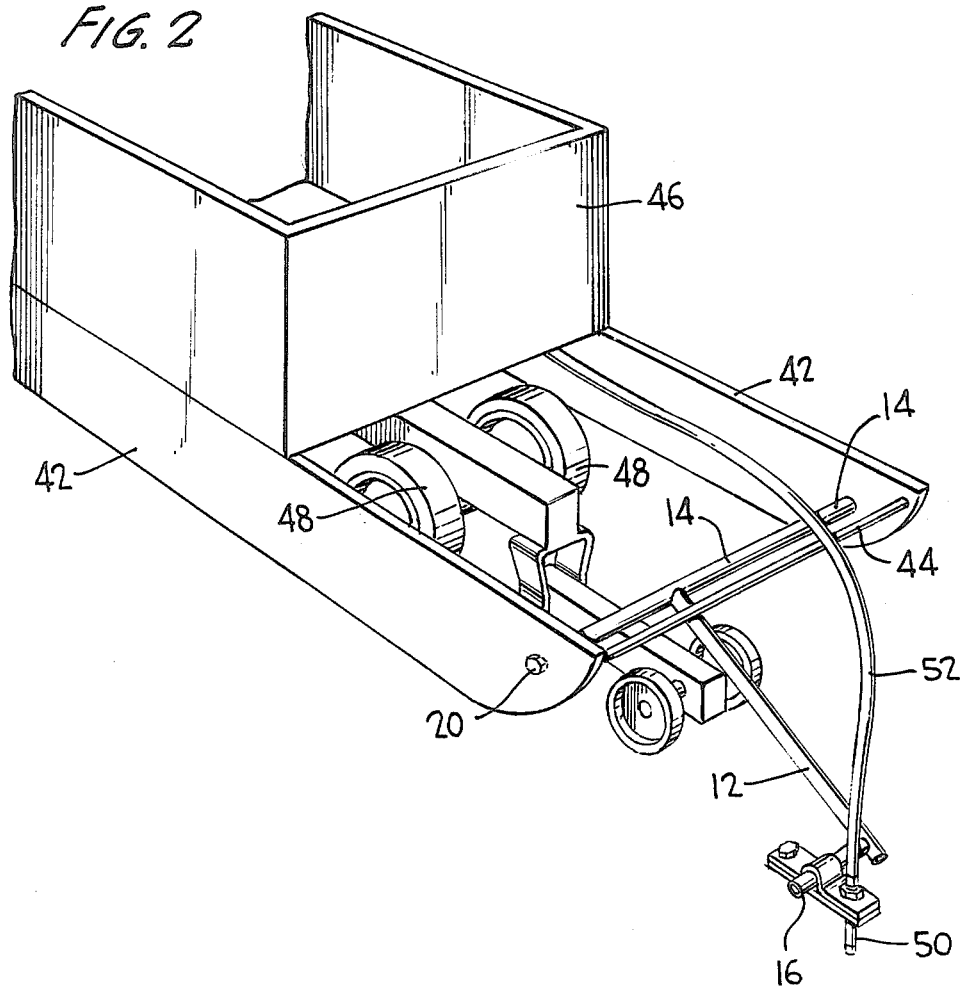
FIG. 2 is a perspective view of the support arm device of FIG. 1 mounted upon an agricultural planter and with the arm device supporting a spray head and liquid delivery line.

FIG. 2 shows the installation of support arm device 10 on one type of agricultural implement, namely planter 40 which, in the portion illustrated comprises frames 42 with cross-member 44, seed box 46 on the frame and supporting wheels 48. Support arm device 10 of the invention is installed such that mounting portion 14 extends between frames 42 and is secured thereto by bolts 20. Spray head 50 is attached to clamp 26 and delivery line 52 carries agricultural liquids from a suitable reservoir (not shown) up to the spray head.

As is evident from an examination of FIG. 2, support arm device 10 allows spray head 50 to be oriented in wide variety of positions. Loosening of bolts 20 allows device 10 to be rotated about the axis of mounting portion 14 and thus position the spray head either closer or further away from the ground. Loosening of bolt 28 on clamp 26 allows the clamp to be repositioned along the length of leg portion 16 and allows for angular reorientation of spray head 50 about the axis of the leg portion. Thus, the position of spray head 52 can be adjusted in three different directions by simple manipulation of device 10 and as a consequence, a wide variety of chemicals can be applied and a variety of sizes of crops can be treated by use of the device of the present invention.

The embodiment of the device according to the invention shown in FIG. 3 is very similar to the embodiment shown in FIGS. 1 and 2. The only significant difference is that leg portion 16 of this embodiment is significantly longer and support portion 12 is secured to the leg portion at a point intermediate of its ends. Thus leg portion 16 projects from both sides of support portion 12 thereby providing more adjustablity in the positioning of clamp 26 and consequently of spray head 50.

In addition, the embodiment shown in FIG. 3 is attached to planter frames 42 by means of brackets 60 rather than directly to the frames themselves. Brackets 60 may be made of plate steel and secured to frames 42 by a plurality of bolts.

In FIG. 4, support arm device 10 is secured to frame member 70 of an agricultural implement by L-shaped bracket 72. It should be noted that in this mounting method, only one end of mounting portion 14 is secured to bracket 72, the other end being free.

The manner of mounting support arm device 10 illustrated in FIG. 5 is similar to that of FIG. 4 except that bracket 74 is positioned horizontally and is secured to box-like frame member 76 of agricultural implement by means of shackle 78.

In all the embodiments of the invention shown herein, it will be appreciated that support arm devices 10 according to the invention provide for enhanced flexibility in spraying agricultural chemicals and the devices can be used on a wide variety of farm machinery. Furthermore, the adjustability feature of the devices enables one to easily spray a wide variety of crops of different heights.

While there has been shown and described what is considered to be a preferred embodiment of the present invention, it will be apparent to those skilled in the art that various changes and modifications may be made therein without departing from the invention as defined in the appended claims.

It is claimed:

1. An agricultural implement for spraying liquids comprising a frame and an adjustable support arm device attached to the frame so as to be capable of various vertical orientations relative to the frame, the support arm device comprising an elongated support portion having a longitudinal axis; an elongated mounting portion fixedly attached at a point between its ends to one end of the support portion, the mounting portion having a longitudinal axis transverse to the axis of the support portion and at least one end of the mounting portion including fastening means including a bolt within a threaded hole extending along the axis of the mounting portion and extending though the frame, the bolt attaching the mounting portion to the frame so as to allow vertical adjustment of the device relative to the frame; an elongated leg portion attached to the other end of the support portion and having a longitudinal axis transverse to the axis of the support portion; and a releasable clamp about the leg portion, the clamp including means for securing a spray head to the leg portion.

2. A device in accordance with claim 1 wherein the end of the support portion is attached to an end of the leg portion.

3. A device in accordance with claim 1 wherein the end of the support portion is attached to the leg portion at a point between the ends of the leg portion.

4. A device in accordance with claim 1 wherein the clamp comprises two elongated straps secured together at one end and bolted together at their other end, the intermediate portions of one strap extending about one side of the leg portion and the intermediate portion of the other strap extending about another side of the leg portion.

5. A device in accordance with claim 1 further including a mounting bracket having an aperture, the fastening means of the mounting portion extending through the aperture.

6. A device in accordance with claim 5 including two mounting brackets each having an aperture and the mounting portion includes two fastening means, one fastening means extending through each aperture.

7. A device in accordance with claim 5 wherein the fastening means includes a bolt within a threaded hole extending along the axis of the mounting portion.

* * * * *